United States Patent
Barnel et al.

(10) Patent No.: US 10,079,563 B2
(45) Date of Patent: Sep. 18, 2018

(54) SUPPORT STRUCTURE ADJUSTMENT

(71) Applicant: HEWLETT-PACKARD DEVELOPMENT COMPANY, L.P., Houston, TX (US)

(72) Inventors: Frederic Barnel, Sant Cugat del Valles (ES); David Toussaint, Barcelona (ES); Carlos Chover, Sant Cugat del Valles (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/504,252

(22) PCT Filed: Aug. 28, 2014

(86) PCT No.: PCT/EP2014/068275
§ 371 (c)(1),
(2) Date: Feb. 15, 2017

(87) PCT Pub. No.: WO2016/029951
PCT Pub. Date: Mar. 3, 2016

(65) Prior Publication Data
US 2017/0279389 A1    Sep. 28, 2017

(51) Int. Cl.
*H02P 8/08* (2006.01)
*B41J 11/42* (2006.01)
*B41J 11/057* (2006.01)
*B41J 11/00* (2006.01)
*B65H 5/00* (2006.01)
*H02P 8/36* (2006.01)

(52) U.S. Cl.
CPC ............... *H02P 8/08* (2013.01); *B41J 11/009* (2013.01); *B41J 11/057* (2013.01); *B41J 11/42* (2013.01); *B41J 11/0035* (2013.01); *B65H 5/00* (2013.01); *B65H 2511/13* (2013.01); *H02P 8/36* (2013.01)

(58) Field of Classification Search
CPC .......... H02P 8/08; B41J 11/009; B41J 11/057; B41J 11/42
See application file for complete search history.

(56) References Cited

U.S. PATENT DOCUMENTS

| | | | |
|---|---|---|---|
| 4,738,552 A | 4/1988 | Kikuchi et al. | |
| 4,917,512 A | 4/1990 | Mimura et al. | |
| 6,382,752 B1 * | 5/2002 | Riou | B41J 25/304 347/37 |
| 6,488,422 B1 | 12/2002 | Silverbrook | |
| 6,637,958 B2 | 10/2003 | Smith | |
| 7,591,602 B2 | 9/2009 | Fukumasu et al. | |
| 7,950,757 B2 | 5/2011 | Kumagai | |
| 8,641,307 B2 | 2/2014 | Silverbrook et al. | |

(Continued)

*Primary Examiner* — Bradley Thies
(74) *Attorney, Agent, or Firm* — HP Inc. Patent Department

(57) ABSTRACT

According to one example there is provided a method of adjusting a support structure. The method comprises obtaining a reference orientation of the support structure when the support structure is positioned in a reference position. The height of the support structure is adjusted to a predetermined position and the orientation of the support structure is adjusted such that the orientation of the support structure when in the predetermined position is substantially the same as the reference orientation.

18 Claims, 4 Drawing Sheets

(56) References Cited

U.S. PATENT DOCUMENTS

| | | |
|---|---|---|
| 2009/0322825 A1 | 12/2009 | Labar |
| 2010/0121477 A1 | 5/2010 | Jonas |
| 2011/0155010 A1* | 6/2011 | MacLeod ............... B41J 2/2146 101/481 |
| 2014/0022293 A1 | 1/2014 | Garvi et al. |

\* cited by examiner

SUPPORT STRUCTURE ADJUSTMENT

BACKGROUND

In many printing systems the distance between a print engine, and the media which is to be printed on is an important parameter in ensuring high quality printing. In inkjet printing systems, for example, the distance between the lower surface of an inkjet printhead from which drops of printing fluid are ejected, and the top surface of a media is often referred to as the pen to paper spacing (PPS).

Some printing systems enable the height of the print engine to be modified such that an optimal PPS may be maintained when printing on media of different thicknesses.

BRIEF DESCRIPTION

Examples will now be described, by way of non-limiting example only, with reference to the accompanying drawings, in which.

DETAILED DESCRIPTION

In inkjet printing systems a print engine may comprise one or multiple inkjet printheads. Depending on the printer configuration, the type of print engine support structure may differ. For example, in scanning inkjet printers, one or multiple inkjet printheads may be insertable into a carnage that is moveable bi-directionally over one or multiple carriage bars to define a print zone. In page-wide array printers, multiple inkjet printheads may form a static, or substantially static, print bar that defines a print zone.

Some large format printers are able to print on media up to and over 1 meter in length. Accordingly, the weight of print engine support structures, including the weight of anything supported by the support structure, may be quite considerable. For example, in some printers the print engine support structure may weight in excess of several hundred kilos.

To allow the PPS of such print engine support structures to be accurately adjusted, it is common to provide at least one controllable height adjustor at each end of the print engine support structure. A controllable height adjustor may, for example, comprise a motorized screw mechanism.

To provide optimal print quality, the print engine support structure should be positioned parallel to a printer platen, such that the plane of the printhead nozzle plates is parallel with the printer platen. This ensures that the PPS spacing along the whole length of the platen is constant.

However, where each controllable height adjustor is controllable independently, it may be difficult, or costly, to accurately synchronize the movement of each height adjustor and hence difficult to ensure that the print engine support structure and platen remain parallel. In wide-format printers, the large length of the print engine support structures (which may be in excess of 1 m in length) exacerbates the problem. For example, the large distance between each of end of the print engine support structure makes it largely unfeasible to have utilize mechanically coupled height adjustors.

Figure 1:
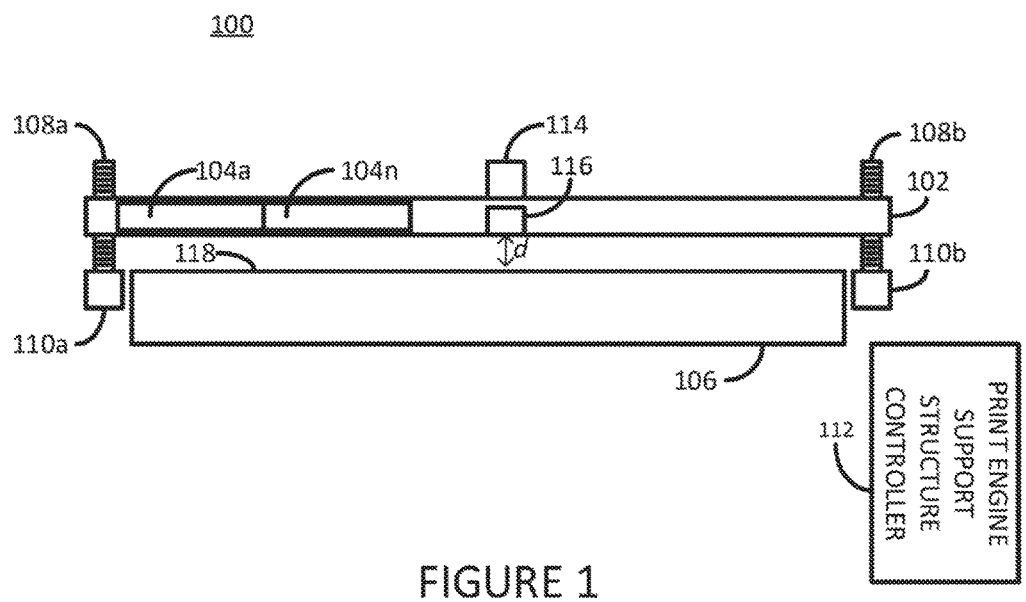
FIG. 1 is a simplified side view of a printer according to one example.
Figure 2:
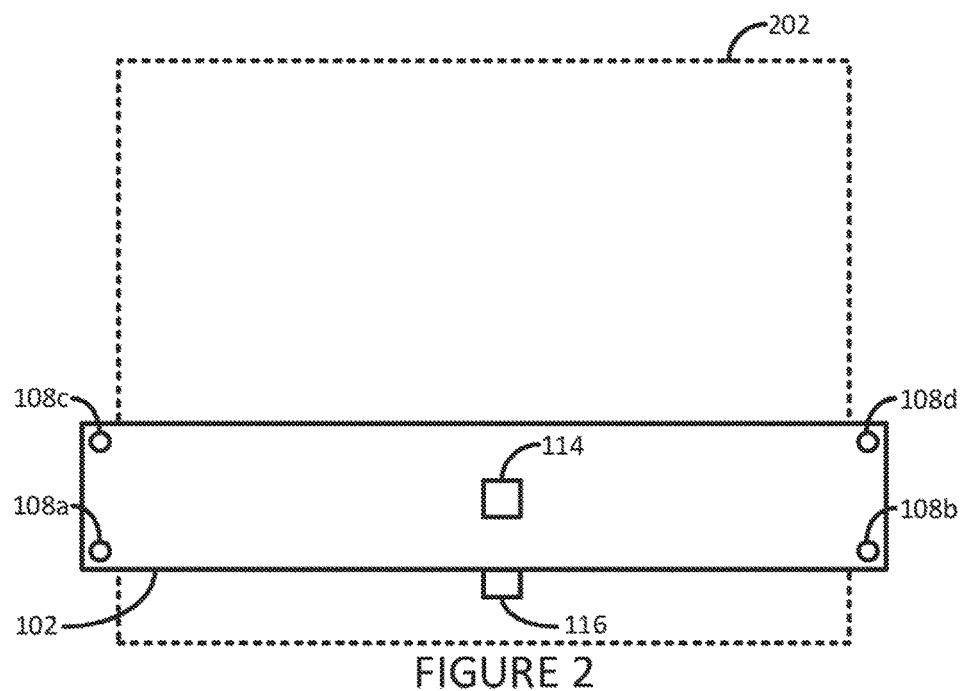
FIG. 2 is a simplified plan view of the printer of FIG. 1 according to one example.

Referring now to FIG. 1 there shown a simplified side view of a printing system 100 according to one example. FIG. 2 shows a corresponding plan view of the printing system 100.

The printing system 100 comprises a print engine support structure 102 to support one or multiple print engines, such as inkjet printheads 104a to 104n. As described above, in one example the print engine support structure 102 may comprise a printhead carriage (not shown) to receive one or multiple inkjet printheads in a scanning inkjet printer configuration. In another example the print engine support structure 102 may comprise multiple inkjet printheads, or may receive multiple inkjet printheads, in a page-wide array printer configuration.

The printing system 100 may print on media of different thicknesses, such as a media 202 shown in FIG. 2, whilst maintaining an optimal PPS height by appropriately adjusting the height of the support structure 102 above a printer platen 106.

The print engine support structure 102 is positioned above the printer platen 106 via height adjustors 108. In the example shown four height adjustors 108a to 108d are provided, although in other examples a smaller or greater number of height adjustors may be provided. As shown in FIG. 2, one height adjustor 108 is provided in the region of each corner of the print engine support structure 102. In one example each height adjustor 108a to 108d is a screw mechanism, although in other examples other suitable mechanisms may be used, such as rack and pinion mechanisms.

Each height adjustor 108a to 108d is coupled to a respective drive mechanism 110a to 110d. In one example each drive mechanism is an electric motor, although in other examples other suitable drive mechanisms may be provided, such as hydraulic drive mechanisms or the like.

Figure 3:
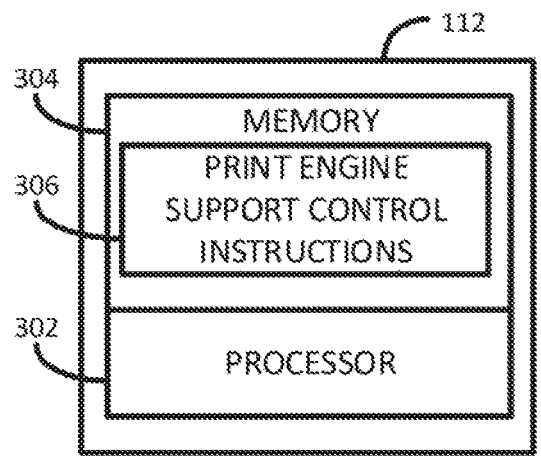
FIG. 3 is a block diagram of a print support structure controller according to one example.

Each drive mechanism 110a to 110d is controlled by a print engine support structure controller 112, which is shown in more detail in FIG. 3. The controller 112 comprises a processor 302, such as a microprocessor or microcontroller, coupled to a non-transitory computer readable memory 304, for example through a communications bus (not shown). The memory 304 stores print engine support structure control instructions 306 which are machine readable instructions that, when executed by the processor 302, cause the controller 112 to control the height of the print engine support structure 102 as described herein in various examples.

The print engine support structure controller 112 enables the height of the print engine support structure 102 to be varied by sending appropriate drive signals to each of the drive mechanisms 110a to 110d. In one example a drive signal may comprise an electrical signal having a predetermined electrical voltage and lasting for a predetermined duration. However, since each drive mechanism may have subtly different characteristics, it is not possible to guarantee that sending the same drive signal to each of the drive mechanisms 110a to 110d will result in the same change in height to be achieved by each respective height adjustor. As previously mentioned, however, ensuring uniform PPS height along the length of the support structure 102 is key to maintaining high print quality.

To ensure uniform PPS height along the length of the support structure 102 a spatial orientation sensor 114 is coupled to the support structure 102. In one example the spatial orientation sensor 114 is an accelerometer. In the example shown the accelerometer is shown coupled to an upper surface of the support structure, although in other examples it may be coupled to any appropriate portion of the support structure, either directly or indirectly.

The accelerometer 114 supplies signals or data that enable the orientation of the accelerometer 114 to be determined in three-dimensional space. For example, in one example the accelerometer 114 supplies signals or data that enable its orientation in the x-axis, the y-axis, and the z-axis to be determined. Although shown in FIG. 1 as a single device, in one example separate spatial orientation sensors may be used to determine an orientation of each of the x-axis, the y-axis, and the z-axis.

A height sensor 116 is also provided that provides appropriate signals to the controller 112 to enable the controller 112 to determine when a predetermined PPS height has been achieved. The height sensor, may for example, be any electronic device to suitable for measuring distance, and may include, without limitation, a laser, an ultrasound module, a mechanical or optical encoders, or the like.

Each height adjustor 108a to 108d is associated with a reference position 118. In one example the reference position 118 may be a mechanical reference position, such as the upper surface of the printer platen 106. In other examples the mechanical reference position may be provided, for example, by a plurality of mechanical barriers provided at or in proximity to each of the height adjustors 108a to 108d.

During manufacture of the printer 100 the height adjustors 108 are assembled to a high degree of accuracy such that when the support platform 102 is positioned against the reference position 118 the support structure 102 is substantially parallel to the upper surface of the printer platen 106, and has hence the same orientation as the printer platen 106.

Figure 4:
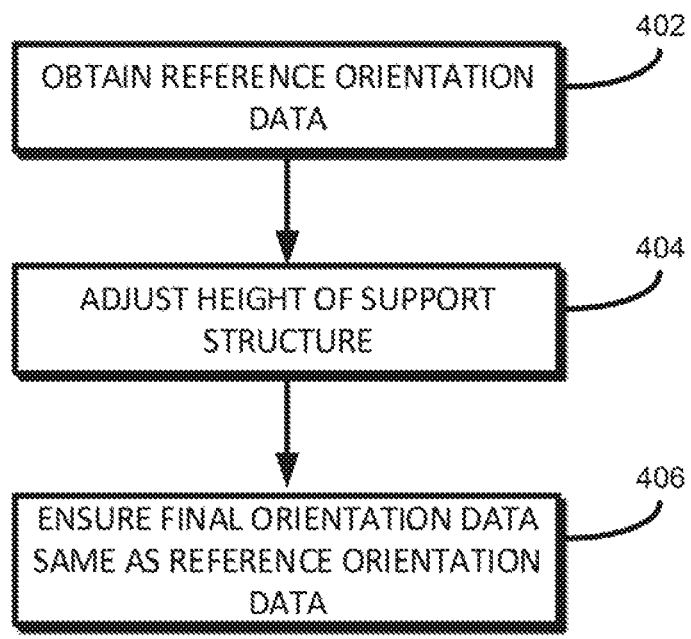
FIG. 4 is a flow diagram outlining a method of operating a printer according to one example.

Operation of the printing system 100 according to one example is described below with reference to the flow diagram of FIG. 4.

At block 402, the controller 112 obtains reference orientation data from the accelerometer 114 when the support platform 102 is in the reference position 118. The orientation data defines the orientation of the accelerometer, and hence indirectly defines the orientation of the support platform 102, at the reference position.

In one example, the controller 112 individually controls each of the height adjustors 108a to 108d, by sending individual drive signals thereto, to move the support structure 102 to the reference position 118 to enable the reference orientation data to be determined.

In one example the controller 112 may determine that the support structure 102 is against the reference position by sensing an appropriate change in electrical current in each of the drive mechanisms, for example as each drive mechanism experiences an increase in torque as the support structure 102 is positioned against the reference position 118. In other examples the controller 112 may determine that the support structure 102 is against the reference position by using a suitable configuration of switches, pressure sensors, or other appropriate sensing devices.

It important to obtain the orientation data whilst the support platform 102 is in the reference position, since the printer 100 may be installed such that it is not perfectly level. Accordingly, it is not appropriate to assume that the support platform 102 is completely level whilst it is in the reference position 118.

At block 404, the controller 112 individually controls each of the height adjustors 108a to 108d to adjust the height of the support structure 102 to a predetermined height above the printer platen 106. The controller 112 may individually control each of the height adjustors 108a to 108d to adjust the height of the support structure 102 until the controller 112 determines from the height sensor 116 that the support platform has been adjusted to the predetermined height.

At block 406, the controller 112 obtains orientation data from the accelerometer 114 to determine the orientation of the support platform at the predetermined height. If the controller 112 determines that the orientation of the support platform 102 at the predetermined height matches (within an acceptable degree of tolerance) the reference orientation this indicates that the support platform 102 is parallel to the platen 106 and that the PPS height is uniform.

If, however, the controller 112 determines that the orientation of the support platform 102 at the predetermined height does not match (within an acceptable degree of tolerance) the reference orientation, the controller 112 may further control one or more of the height adjustors 108a to 108d to bring the orientation of the support platform 102 into the same orientation as the reference orientation. The determination of which height adjustor(s) to adjust may be made based can the determined orientation data.

Once this has been achieved, the controller 112 may verify, using the height sensor, that the support platform is still at the predetermined height, and if not the controller 112 may make further control appropriate ones of the height adjustors 108a to 108d to bring the height of the support platform 102 to the predetermined height.

The controller 112 may perform multiple iterations of adjusting the orientation and adjusting the height of the support platform 102 until the orientation and height are within acceptable tolerances.

In the above-described example the orientation of the support platform 102 may not be maintained whilst the height of the support platform 102 is being adjusted. This may occur, for example, if one of the drive mechanisms 110a to 110d operates at a different speed for a given drive signal.

In some circumstances, however, it may be beneficial, or even critical, to maintain the orientation of the support platform 102 in its reference orientation whilst it is being raised or lowered. For example, this may help reduce the risk of the support platform 102 become bent or distorted when the PPS height is adjusted.

Operation of the printing system 100 according to a further example is described below with reference to the flow diagram of FIG. 5.

At block 502 the controller 112 individually controls each of the height adjustors 108a to 108d to move the support structure 102 to the reference position 118 to enable the reference orientation data to be determined.

At block 504, the controller 112 obtains reference orientation data from the accelerometer 114 when the support platform 102 is in the reference position 118.

At block 506 the controller 112 sends individual drive signals to each height adjustor 108a to 108d to individually adjust the height of the support structure 102. As the height of the support structure 102 is being adjusted, at block 508 the controller 112 obtains orientation data from the support structure 102 from its current position.

At block 510 the controller 112 determines whether any modification to the drive signals being sent to each height adjustor 108a to 108d should be made to ensure that the support platform is maintained in the same orientation as the reference orientation whilst the height of the support structure 102 is being adjusted. If any modifications are deemed appropriate the controller 112 adjusts the appropriate drive signals being sent.

At block 512 the controller 112 determines whether the support platform 102 has been adjusted to the predetermined height. If not, the above described process continues until the predetermined height is reached and the process stops at block 514.

Figure 5:
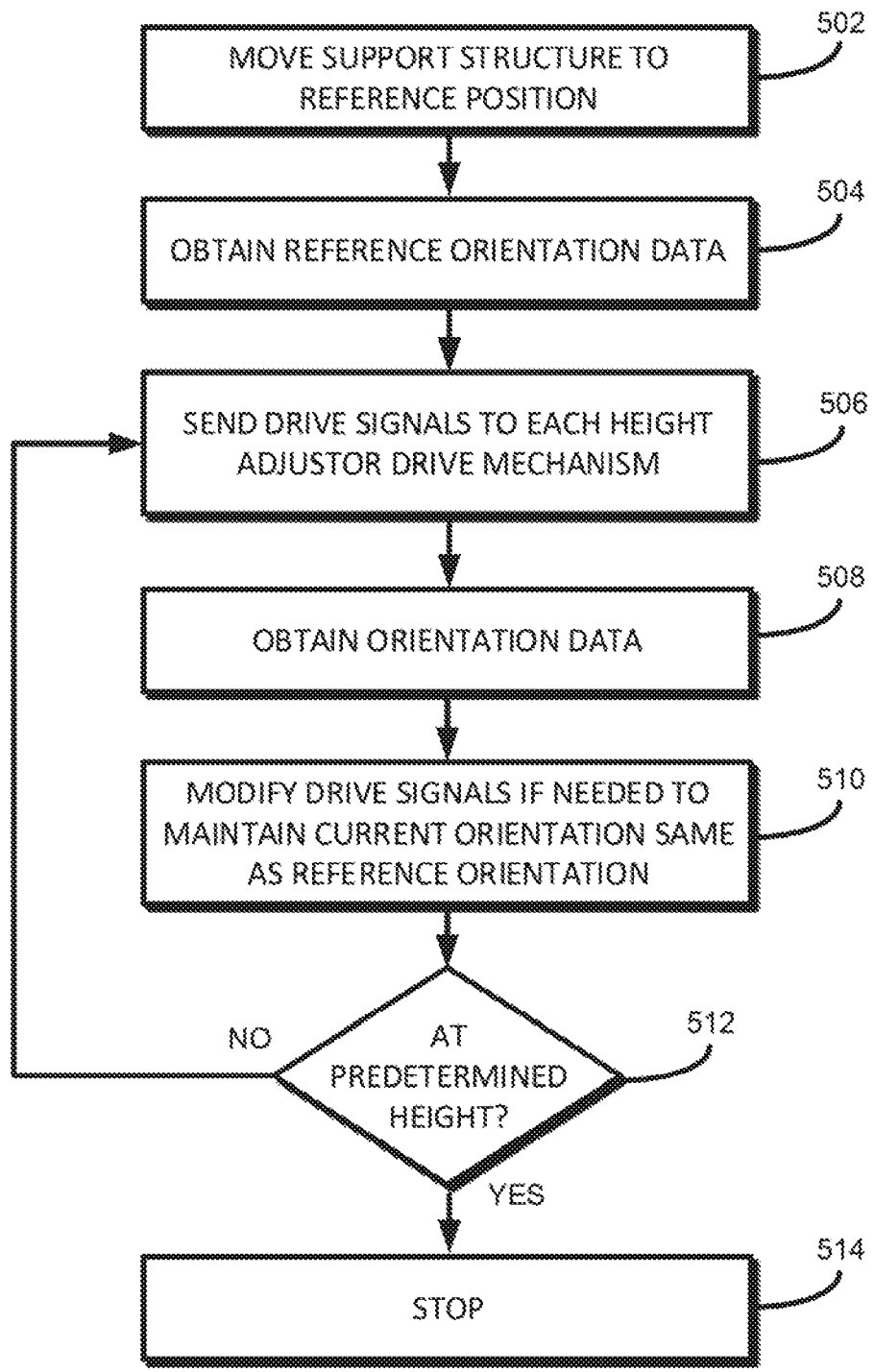
FIG. 5 is a flow diagram outlining a method of operating a printer according to one example.
Figure 6:
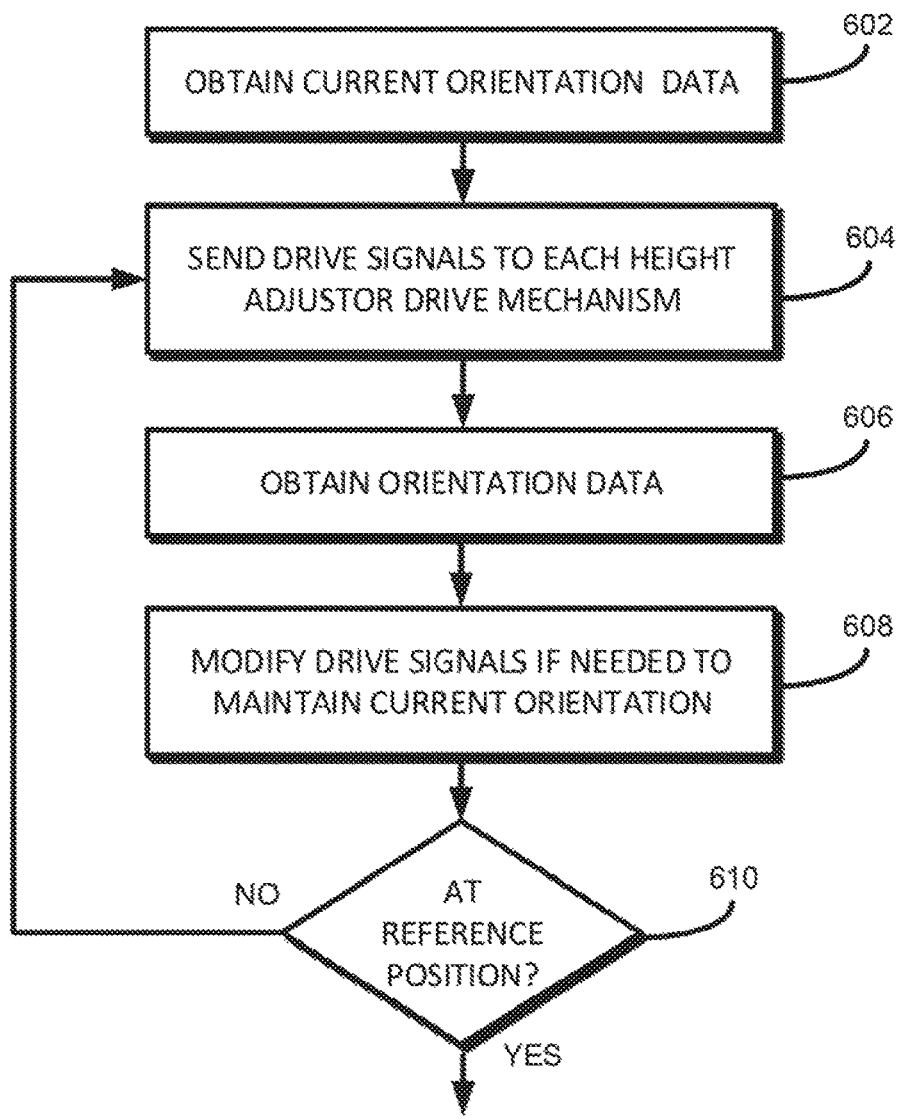
FIG. 6 is a flow diagram outlining a method of operating a printer according to one example.

In a further example, shown in FIG. 6, the controller 112 performs the operations shown in blocks 602 to 610 in place of the operation shown in block 502 of FIG. 5.

Thus, at block 602, the controller 112 obtains orientation data from the accelerometer 114 when the support platform 102 is in its current position.

At block 504 the controller 112 sends individual drive signals to each height adjustor 108a to 108d to individually adjust the height of the support structure 102 to move the support structure 102 to the reference position 118.

As the height of the support structure 102 is being adjusted, at block 606 the controller 112 obtains orientation data from the support structure 102 from its current position.

At block 605 the controller 112 determines whether any modification to the drive signals being sent to each height adjustor 108a to 108d should be made to ensure that the support platform is maintained in the same orientation whilst the height of the support structure 102 is being adjusted. If any modifications are deemed appropriate the controller 112 adjusts the appropriate drive signals being sent.

At block 610, the controller 112 determines when the support structure 102 is in the reference position 118. In some circumstances the orientation of the support platform 102 may have to be adjusted in order to align the support platform 102 with the reference position 118.

The controller 112 then continues with performing the operations shown in blocks 504 to 514 as shown in FIG. 5 and as described above.

In this way, the controller 112 may adjust the height of the support structure 102 whilst ensuring that the orientation the support structure 102 remains substantially constant.

It will be appreciated that some examples of the present invention can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are examples of machine-readable storage that are suitable for storing a program or programs that, when executed, implement examples described herein. Accordingly, some examples provide a program comprising code for implementing a system or method as claimed in any preceding claim and a machine readable storage storing such a program.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. A printing system comprising:
a platen;
a print engine support structure;
a spatial orientation sensor coupled to the print engine support structure;
a plurality of individually controllable height adjusters to adjust a distance between the print engine support structure and the platen; and
a controller to:
control the height adjusters to move the print engine support structure to a reference position and obtain a reference orientation of the print engine support structure from the spatial orientation sensor at the reference position;
control the height adjusters to move the print engine support structure to a predetermined height above the platen such that an orientation of the print engine support structure, as obtained from the spatial orientation sensor at the predetermined height, is substantially the same as the reference orientation.

2. The printing system of claim 1, wherein the controller is to move the print engine support structure to the predetermined height by sending individual drive signals to each of the height adjustors.

3. The printing system of claim 1, wherein when in the reference position the print engine support structure is substantially parallel to the platen.

4. The printing system of claim 1, further comprising a height sensor, and wherein the controller is to determine when the print engine support structure has been adjusted to the predetermined height based on signals from the height sensor.

5. The printing system of claim 1, wherein the controller is to determine, when the print engine support structure is at the predetermined height, whether the orientation of the print engine support structure is substantially the same as the reference orientation.

6. The printing system of claim 1, wherein the controller is to adjust the orientation of the print engine support structure such that the orientation of the print engine support structure at the predetermined height is substantially the same as the reference orientation.

7. The printing system of claim 1, wherein the controller is to control the height adjusters while moving the print engine support structure from the reference position to the predetermined height such that the orientation of the print engine support structure remains substantially the same as the reference orientation.

8. The printing system of claim 1, wherein the controller is to control the height adjusters while moving the print engine support structure from a current position to the reference position such that the orientation of the print engine support structure remains substantially constant.

9. The printing system of claim 1, wherein each height adjuster is coupled to a respective drive mechanism to drive the height adjustor in response to drive signals supplied by the controller.

10. The printing system of claim 1, wherein the print engine support structure comprises, or is to receive, at least one inkjet printhead.

11. The printing system of claim 1, wherein the spatial orientation sensor is an accelerometer.

12. A method of adjusting a support structure, comprising:
obtaining a reference orientation of the support structure from a spatial orientation sensor when the support structure is in a reference position;
adjusting a height of the support structure to a predetermined position; and
adjusting an orientation of the support structure such that the orientation of the support structure when in the predetermined position, as obtained from the spatial orientation sensor, is substantially the same as the reference orientation.

13. The method of claim 12, wherein the support structure is supported by a plurality of independently controllable height adjustors, and wherein adjusting the height and adjusting the orientation of the support structure comprises sending individual drive signals to each respective height adjustor.

14. The method of claim 13, wherein obtaining a reference orientation comprises controlling the height adjustors to move the support structure to the reference position and obtaining the reference orientation of the support structure while the support structure is in the reference position.

15. The method of claim 13, further comprising controlling the height adjustors to maintain the orientation of the support structure in substantially the same orientation as the reference orientation while moving the support structure from the reference position to the predetermined position.

16. The method of claim 13, wherein the spatial orientation sensor is an accelerometer.

17. A non-transitory computer readable media on which are stored processor understandable instructions that, when executed by a processor, control a printing system to:
obtain a reference orientation of a print engine support structure from a spatial orientation sensor when the print engine support structure is in a reference position; and
individually adjust a height of a plurality of height adjustors coupled to the print engine support structure to move the print engine support structure to a predetermined position while maintaining an orientation of the print engine support structure, as obtained from the spatial orientation sensor, in substantially the same orientation as the reference orientation.

18. The non-transitory computer readable media of claim 17, wherein the spatial orientation sensor is an accelerometer.

* * * * *